US012612336B2

(12) United States Patent
Donovan et al.

(10) Patent No.: US 12,612,336 B2
(45) Date of Patent: Apr. 28, 2026

(54) PERLITE-FREE, LIGHTWEIGHT SETTING-TYPE JOINT COMPOUND COMPOSITIONS

(71) Applicant: KNAUF GIPS KG, Iphofen (DE)

(72) Inventors: Alexander J. Donovan, North Chelmsford, MA (US); Naveen Punati, Kildeer, IL (US)

(73) Assignee: KNAUF GIPS KG, Iphofen (DE)

( * ) Notice: Subject to any disclaimer, the term of this patent is extended or adjusted under 35 U.S.C. 154(b) by 361 days.

(21) Appl. No.: 18/205,074

(22) Filed: Jun. 2, 2023

(65) Prior Publication Data

US 2024/0150244 A1      May 9, 2024

Related U.S. Application Data

(60) Provisional application No. 63/422,746, filed on Nov. 4, 2022.

(51) Int. Cl.

| | |
|---|---|
| *C04B 28/14* | (2006.01) |
| *C04B 11/02* | (2006.01) |
| *C04B 14/10* | (2006.01) |
| *C04B 14/20* | (2006.01) |
| *C04B 14/28* | (2006.01) |
| *C04B 24/06* | (2006.01) |
| *C04B 24/26* | (2006.01) |
| *C04B 24/38* | (2006.01) |
| *C04B 38/10* | (2006.01) |
| *C04B 40/00* | (2006.01) |
| *C04B 40/06* | (2006.01) |
| *C04B 103/00* | (2006.01) |
| *C04B 103/12* | (2006.01) |
| *C04B 103/40* | (2006.01) |
| *C04B 103/48* | (2006.01) |
| *C04B 111/00* | (2006.01) |
| *C04B 111/40* | (2006.01) |
| *E04F 21/02* | (2006.01) |

(52) U.S. Cl.
CPC ........... *C04B 28/146* (2013.01); *C04B 11/02* (2013.01); *C04B 14/102* (2013.01); *C04B 14/20* (2013.01); *C04B 14/28* (2013.01); *C04B 24/06* (2013.01); *C04B 24/2623* (2013.01); *C04B 24/383* (2013.01); *C04B 38/10* (2013.01); *C04B 40/0032* (2013.01); *C04B 40/0042* (2013.01); *C04B 40/0641* (2013.01); *E04F 21/026* (2013.01); *C04B 2103/0079* (2013.01); *C04B 2103/12* (2013.01); *C04B 2103/40* (2013.01); *C04B 2103/48* (2013.01); *C04B 2111/00637* (2013.01); *C04B 2111/40* (2013.01); *C04B 2201/20* (2013.01)

(58) Field of Classification Search
CPC ..... C04B 28/146; C04B 11/02; C04B 14/102; C04B 14/20; C04B 14/28; C04B 24/06; C04B 24/2623; C04B 24/383; C04B 38/10; C04B 40/0032; C04B 40/0042; C04B 40/0641; C04B 2103/0079; C04B 2103/12; C04B 2103/40; C04B 2103/48; C04B 2111/00637; C04B 2111/40; C04B 2201/20; C04B 2111/00689; C04B 2111/10; C04B 28/145; E04F 21/026
See application file for complete search history.

(56) References Cited

U.S. PATENT DOCUMENTS

| | | |
|---|---|---|
| 3,236,509 A | 2/1966 | Blair |
| 3,297,601 A | 1/1967 | Maynard et al. |
| 3,307,915 A | 3/1967 | Conroy et al. |
| 3,502,490 A | 3/1970 | Ware |
| 3,573,947 A | 4/1971 | Kinkade et al. |
| 4,113,836 A | 9/1978 | O'Connor |
| 4,117,070 A | 9/1978 | O'Neill |
| 4,153,373 A | 5/1979 | O'Neill |
| 4,183,908 A | 1/1980 | Rolfe |
| 4,201,595 A | 5/1980 | O'Neill |
| 4,454,267 A | 6/1984 | Williams |
| 4,657,594 A | 4/1987 | Struss |
| 5,746,822 A | 5/1998 | Espinoza et al. |
| 6,039,800 A | 3/2000 | Islam |
| 6,409,825 B1 | 6/2002 | Yu et al. |
| 6,545,066 B1 | 4/2003 | Immordino et al. |
| 6,565,645 B1 | 5/2003 | Klein et al. |
| 6,884,830 B1 | 4/2005 | Hornaman et al. |
| 7,504,165 B2 | 3/2009 | Lettkeman et al. |

(Continued)

FOREIGN PATENT DOCUMENTS

| | | |
|---|---|---|
| CN | 105 906 294 A | 8/2016 |
| CN | 102958865 B | 9/2016 |

(Continued)

OTHER PUBLICATIONS

PCT Search Report and Written Opionion dated Apr. 30, 2024 for PCT Application No. PCT/US2023/078200.

*Primary Examiner* — Anthony J Green
(74) *Attorney, Agent, or Firm* — Pradip Sahu; Greer, Burns & Crain, Ltd.

(57) ABSTRACT

Perlite-free, lightweight setting-type joint compounds which comprise calcium sulfate hemihydrate with a dry density of less than 50 lb/ft$^3$, a foaming agent having a HLB value of at least 10 and preferably comprising an alkylbenzene sulfonic acid having a linear alkyl chain containing 8 to 14 carbons and/or a salt thereof, and a combination of rheology modifiers. Methods for building wallboard assemblies and methods for wall patch and repair projects that include applying the perlite-free, lightweight setting-type joint compounds to a substrate.

19 Claims, 5 Drawing Sheets

(56)     References Cited

U.S. PATENT DOCUMENTS

| | | |
|---|---|---|
| 7,897,660 B2 | 3/2011 | Martin et al. |
| 8,580,055 B2 | 11/2013 | Stuart et al. |
| 8,931,230 B2 | 1/2015 | Negri et al. |
| 8,969,472 B2 | 3/2015 | Stewart et al. |
| 9,027,303 B2 | 5/2015 | Lichtinger et al. |
| 9,169,426 B2 | 10/2015 | Negri et al. |
| 9,174,881 B2 | 11/2015 | Cimaglio et al. |
| 9,249,578 B2 | 2/2016 | Negri et al. |
| 9,915,065 B2 | 3/2018 | Bernardi et al. |
| 10,131,580 B2 | 11/2018 | Gehrig et al. |
| 10,669,215 B2 | 6/2020 | Stevens et al. |
| 11,220,615 B2 | 1/2022 | Ayambem |
| 2004/0099362 A1 | 5/2004 | Martin et al. |
| 2010/0175590 A1 | 7/2010 | Stevens et al. |
| 2016/0031761 A1 | 2/2016 | Munie et al. |
| 2016/0318815 A1 | 11/2016 | Thouilleux et al. |

FOREIGN PATENT DOCUMENTS

| | | |
|---|---|---|
| CN | 113 213 808 B | 5/2022 |
| WO | WO 2007/024420 A2 | 3/2007 |

| Series Number Reference | Description | Dry Density | By Hand |
|---|---|---|---|
| 1711A, 1714A | Easy Sand Control (47% α hemihydrate) | Within specification | Within specification |
|  | 70% α hemihydrate, (-) Perlite | Within 5% |  |
| 1711E | 70% α hemihydrate, (-) Perlite + 0.03% DDBSA + 0.3% Xanthan Gum | Within 5% | Within 15% |
| 1711F | 70% α hemihydrate, (-) Perlite + 0.03% DDBSA + 0.3% CAPB | Within 5% | Within 15% |
| 1711H | 70% α hemihydrate, (-) Perlite + 0.03% DDBSA + 1.0% CMC | Within 5% | Within 15% |
| 1714B | 70% α hemihydrate, (-) Perlite + 0.03% DDBSA + 0.3% CAPB + 6% Attapulgite + 0.4% HPMC (3200 cps) | Within specification | Within 15% |
| 1714C | 90% α hemihydrate, (-) Perlite + 0.03% DDBSA + 0.3% CAPB | Within specification | Within 15% |
| 1714D | 70% α hemihydrate, (-) Perlite + 0.03% DDBSA + 0.5% PVOH + 0.3% MHPC (30,000cps) + 0.03% Lime + 5% Mica + 0.3% CAPB | Within specification |  |

FIG. 2

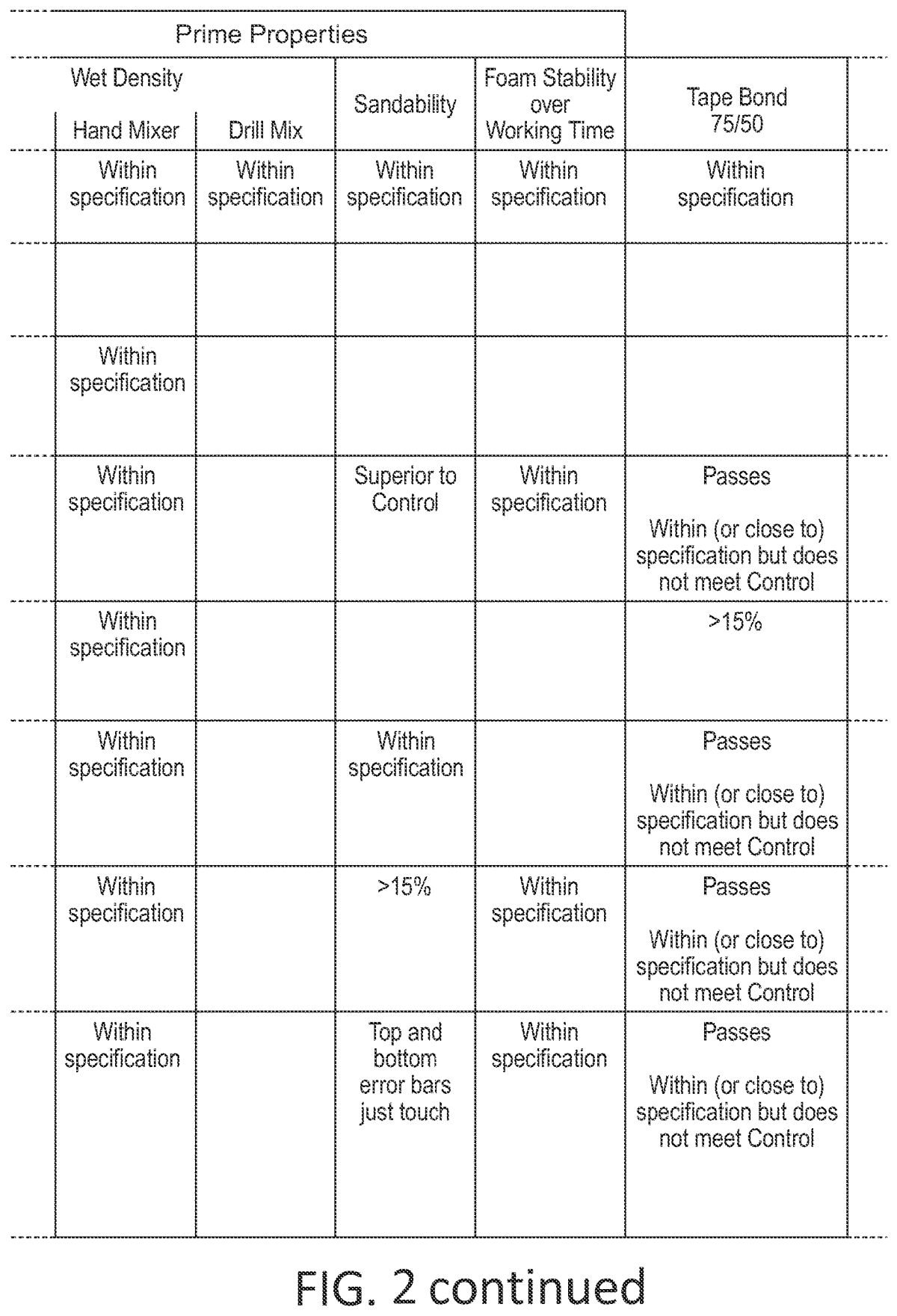

| Prime Properties | | | | |
| Wet Density | | Sandability | Foam Stability over Working Time | Tape Bond 75/50 |
| Hand Mixer | Drill Mix | | | |
| Within specification | Within specification | Within specification | Within specification | Within specification |
| | | | | |
| Within specification | | | | |
| Within specification | | Superior to Control | Within specification | Passes<br><br>Within (or close to) specification but does not meet Control |
| Within specification | | | | >15% |
| Within specification | | Within specification | | Passes<br><br>Within (or close to) specification but does not meet Control |
| Within specification | | >15% | Within specification | Passes<br><br>Within (or close to) specification but does not meet Control |
| Within specification | | Top and bottom error bars just touch | Within specification | Passes<br><br>Within (or close to) specification but does not meet Control |

FIG. 2 continued

| Deep-Fill Cracking | Shrinkage | Hand Application | Consistency |
|---|---|---|---|
| Within specification | Within specification | Within specification | Within specification |
|  |  |  |  |
| >15% |  |  | Within specification |
| Rough surface<br><br>Within (or close to) specification but does not meet Control | Within specification | >15% | Within 15% |
| >15% | >15% |  | Within specification |
| Microcracks<br><br>within 5% | Within specification | Within 5% | 54cc<br><br>Within (or close to) specification but does not meet Control |
| Rough surface, a few microcracks<br><br>within 5% | Within specification | Within 15% | Within 5% |
| Microcracks<br><br>within 5% | Within specification | Grainy mix, tearing on edges with second applicator; other respects better<br><br>Within (or close to) specification but does not meet Control | Within specification |

FIG. 2 continued 2

| Thickening Curve | Vicat Set | pH | Color | Overall Performance |
|---|---|---|---|---|
| Within specification | Within specification | Within specification | Within specification | 100% |
| | Within specification | | Darker within 5% | 7% |
| | >15% | | Darker within 5% | 13% |
| | >15% | | Darker within 5% | 40% |
| | Extreme | | Darker within 5% | 13% |
| Within specification | Within specification | Within specification | Darker within 5% | 60% |
| Within specification | Within specification | Within (or close to) specification but does not meet Control | Darker within 5% | 53% |
| Within specification | Within specification | Within specification | Darker within 5% | 73% Superior to Control |

FIG. 2 continued 3

PERLITE-FREE, LIGHTWEIGHT SETTING-TYPE JOINT COMPOUND COMPOSITIONS

CROSS-REFERENCE TO RELATED APPLICATIONS

This application claims the benefit of priority from U.S. Provisional Patent Application 63/422,746 filed Nov. 4, 2022, the entire disclosures of which is herein incorporated by reference in its entirety.

TECHNICAL FIELD

This disclosure relates to compositions for perlite-free, lightweight setting-type joint compounds useful as all-purpose joint compounds in interior and exterior finishings, including in filling and finishing seams between adjacent interior gypsum panels or exterior gypsum panels, and/or for wall patch and repair projects.

BACKGROUND

Gypsum wallboards which can be also referred to as drywall are commonly used in construction of walls and ceilings in commercial and residential buildings. Often, a wall or ceiling is assembled by attaching wallboards one by one to a supporting frame (studs). A seam between two adjacent attached wallboards or other gypsum panels is called a joint. In order to strengthen the wall assembly and create a wall with a monolithic and even surface without gaps, the joints are filled with an adhesive compound, called a joint compound. Finishing a seam (joint) may require several coats of a joint compound, depending on a shrinkage rate of the joint compound. After the applied joint compound sets, it is often sanded before the wall can be coated with a primer and/or painted and/or decorated.

Examples of wall assemblies and joint compounds known in the art include those disclosed in U.S. Pat. Nos. 4,454, 267, 6,545,066, 8,931,230 and 9,169,426, the entire disclosures of which are incorporated herein by reference.

Conventional joint compounds include drying-type joint compounds and setting-type joint compounds, including as described in U.S. Pat. Nos. 4,454,267, 5,746,822, 6,545,066, and 10,669,215, the disclosures of which are herein incorporated in their entirety. Drying-type joint compounds harden through the evaporation of water, while setting-type joint compounds harden by curing because they comprise calcined gypsum which hydrates into a gypsum matrix after being mixed with water. Accordingly, joint compounds formulated with calcined gypsum may be referred in this disclosure as setting-type joint compounds.

Originally described in U.S. Pat. No. 4,454,267, setting-type joint compounds which comprise perlite are commonly used. Some of the technical advantages for joint compounds that comprise perlite include light weight, good bond to a substrate and sanding ease. However, perlite is a naturally occurring mineral and it is important to preserve natural resources. Thus, there is a need in the field to develop joint compounds that would not utilize perlite, but would have properties similar to joint compounds which comprise perlite, including light weight and sanding ease.

SUMMARY

This disclosure addresses at least some of these needs and provides in one aspect, a perlite-free, lightweight setting-type joint compound composition comprising calcined gypsum and a foaming agent.

In one aspect, this disclosure provides a composition for perlite-free, lightweight setting-type joint compound, wherein the composition comprises:

calcium sulfate hemihydrate with a dry density of less than 50 lb/ft$^3$ and water consistency of at least 50 cc of water per 100 grams of calcium sulfate hemihydrate;

a foaming agent having a hydrophilic-lipophilic balance (HLB) value of at least 10, the foaming agent preferably comprising an alkylbenzene sulfonic acid having a linear alkyl chain containing 8 to 14 carbons and/or a salt thereof;

optionally, a co-surfactant, wherein the co-surfactant includes a betaine, alkanolamide, alkylpolyglucoside, alkyl ethoxylate, or any combination thereof;

a rheology modifier including one or more of the following: modified cellulose, starch, and/or attapulgite clay; and wherein the composition does not comprise perlite.

Embodiments for the composition include those, wherein calcium sulfate hemihydrate includes alpha calcium sulfate hemihydrate in an amount ranging from about 50 wt % to about 95 wt % by weight of the dry-powder composition. Preferably, alpha calcium sulfate hemihydrate may be obtained by autoclaving gypsum in a saturated steam atmospheric pressure, and wherein alpha calcium sulfate hemihydrate has a dry density of about 45 lb/ft$^3$ and water consistency of about 60 cc per 100 grams of alpha calcium sulfate hemihydrate.

In certain embodiments, the composition may comprise from about 0.01 wt % to about 0.5 wt % of the foaming agent by weight of the dry-powder composition. In some embodiments, the composition may comprise dodecyl benzene sulfonic acid or any salt thereof.

In some embodiments, the composition may comprise from about 0.1 wt % to about 1.0 wt % of the co-surfactant by weight of the dry-powder composition. Preferred embodiments include compositions which comprise cocoamidopropyl betaine.

Some compositions may comprise modified cellulose and/or starch in an amount from about 0.1 wt % to about 2 wt % by weight of dry-powder composition.

Some compositions may comprise carboxymethyl cellulose, hydroxypropyl methyl cellulose, xanthan gum, methyl hydroxyethyl cellulose, attapulgite clay, or any combination thereof.

Some compositions may comprise one or more of the following: mica, talc, calcium carbonate, and/or any combination thereof.

The compositions according to this disclosure include those which comprise water in an amount ranging from about 40 cc to 70 cc of water per 100 grams of dry-powder composition.

In preferred embodiments, the compositions may further comprise a binder which may include one or more of the following: starch, polyvinyl alcohol, polyvinyl acetate, styrenebutadiene, ethylenevinyl acetate co-polymer, vinyl-acrylic co-polymer, and/or any combination thereof.

Some preferred compositions include ready-mixed compositions which further comprise water and one or more of phosphate compounds.

Any of the compositions according to this disclosure may further comprise one or more of foaming adjuvants and/or foam stabilizers, or any combination thereof.

Any of the compositions according to this disclosure may further comprise one or more of the following: diethylenetriamine pentaacetic acid, tartaric acid, citric acid, maleic acid or salts thereof, or any combination thereof.

Any of the compositions according to this disclosure may further include one or more set accelerators enclosed in a separate container.

In some embodiment, the composition may comprise:

about 60 wt % to about 90 wt % of alpha calcium sulfate hemihydrate having a dry density in the range from about 30 to about 50 $lb/ft^3$ and having a water consistency of at least about 50 cc of water per 100 grams of calcined gypsum;

about 2 wt % to about 30 wt % of calcium carbonate, by weight of dry-powder composition;

about 0.01 wt % to about 0.5 wt % of sodium dodecyl benzene sulfonate, by weight of dry-powder composition;

optionally, about 0.1 wt % to about 1 wt % of cocamidopropyl betaine, by weight dry-powder composition;

optionally, about 1 wt % to about 10 wt % mica and/or talc, by weight of dry-powder composition;

about 2 wt % to about 10 wt % of attapulgite clay, by weight of dry-powder composition;

about 0.1 wt % to about 2 wt % of one or more pregelatinized starches by weight of dry-powder composition;

about 0.1 wt % to about 2 wt % of one or more of the following: carboxymethyl cellulose, hydroxypropyl methyl cellulose, methyl hydroxyethyl cellulose, or any combination thereof, by weight of dry-powder composition;

optionally, about 0.1 wt % to about 2 wt % of xanthan gum, by weight of dry-powder composition; and about 0.1 wt % to about 10 wt % of a binder, by weight of dry-powder composition.

In another aspect, this disclosure relates to a method for making perlite-free, lightweight setting-type joint compound according to this disclosure, the method comprising:

a) mixing dry components into a first mixture;

b) mixing liquid components and water into a second mixture, and c) supplying the second mixture in a separate container or mixing the first mixture and the second mixture in order to form a setting type joint compound.

In yet a further aspect, this disclosure relates to a method for finishing a seam between two adjacent gypsum panels attached to a stud, the method comprising filling the seam with the composition according to this disclosure, and/or applying the composition according to this disclosure as a top-coat.

In yet another aspect, this disclosure relates to wall assemblies comprising one or more compositions according to this disclosure In yet a further aspect, this disclosure relates to a method for decreasing a wet density of a joint compound which does not comprise perlite, the method comprising: mixing calcium sulfate hemihydrate having a dry density of less than 50 $lb/ft^3$ and water consistency of at least 50 cc of water per 100 grams of calcium sulfate hemihydrate with one or more surfactants having a hydrophilic-lipophilic balance (HLB) value of at least 10, and producing a joint compound paste weighing about 10 lbs/gal to about 12 lbs/gal when mixed with water.

BRIEF DESCRIPTION OF THE DRAWINGS

FIG. 2 is a matrix reporting properties of the perlite-free, lightweight setting-type joint compounds of this disclosure in comparison to a control joint compound which comprises perlite.

DETAILED DESCRIPTION

Figure 1A:
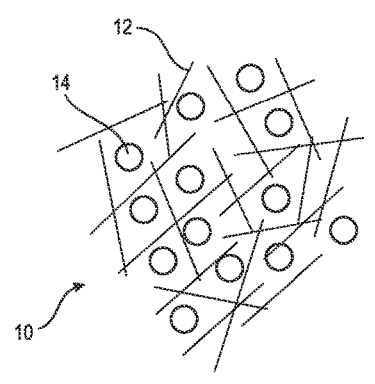
FIG. 1A is a schematic depicting a prior art joint compound with perlite, having a low wet density. This figure is not drawn to scale.

In this disclosure, the term "calcined gypsum" may be used interchangeably with any of the following terms: calcium sulfate hemihydrate, stucco, calcium sulfate semihydrate, plaster, calcium sulfate half-hydrate or plaster of Paris.

In this disclosure, the term "gypsum" may refer to any of the following: naturally mined gypsum (ore), landplaster and/or synthetic gypsum. The term "gypsum" may be used interchangeably with the term "calcium sulfate dihydrate." The "synthetic gypsum" can be also referred to as "chemical gypsum."

In this disclosure, the term "wallboard" means a gypsum panel having a gypsum matrix core sandwiched between two paper cover sheets. The term "wallboard" may be used interchangeable with any of the following terms: gypsum panel, gypsum wallboard, drywall, gypsum board or board.

In this disclosure, the term "about" means a range of plus/minus 5% of the stated value. For example, "about 100" means 100±5 and "about 200" means 200±10.

In this disclosure, the term "wt %" means percentage by weight.

When stucco ($CaSO_4 \cdot \frac{1}{2}H_2O$) is mixed with water into a slurry, stucco hydrates and sets into a gypsum matrix. This setting reaction can be described by the following equation:

$$CaSO_4 \cdot \frac{1}{2}H_2O + 3/2H_2O \rightarrow CaSO_4 \cdot 2H_2O$$

In this disclosure, "calcination" means a process by which gypsum ($CaSO_4 \cdot 2H_2O$) is dehydrated into calcined gypsum ($CaSO_4 \cdot \frac{1}{2}H_2O$). The process includes heating gypsum to evaporate crystalline water. Calcined gypsum can be produced in different crystalline forms such as alpha calcium sulfate hemihydrate and beta calcium sulfate hemihydrate. All crystalline forms and any mixtures thereof are suitable for compositions according to this disclosure.

In this disclosure, various tests may be described. If no temperature, atmospheric pressure and/or humidity is mentioned in connection with a particular test, it means that the test was conducted at room temperature defined as 68 to 77° F. (20 to 25° C.), normal atmospheric pressure of about 101 kPa and a humidity in the range from about 25 to about 75 percent.

In this disclosure, "room temperature" means a temperature in the range 68 to 77° F. (20 to 25° C.).

In this disclosure, ASTM tests refer to tests published by ASTM International, formally known as American Society for Testing and Materials. Detailed test protocols for ASTM tests are available from the ASTM International website.

In this disclosure, "a gypsum slurry" means a water-based gypsum slurry or paste in which calcined gypsum is mixed with at least water, and preferably also with one or more additives.

In this disclosure, the term "formulation" may be used interchangeably with the term "composition" and/or "mixture." In this disclosure, some compositions (formulations or mixtures) may be referred to as "dry" composition or mixture if no water was added to the composition. In this disclosure, "dry" means that no water or other liquid was added to the composition or mixture. Nevertheless, a dry composition or dry mixture may have some moisture content. For example, a dry mixture may have a moisture content of about 1 wt % or less, about 0.05 wt % or less, or about 0 wt %. It should be noted that water molecules bound with stucco are not being considered as "free-water."

In this disclosure, "lightweight joint compound" means a water-based joint compound having a weight of less than 12 pounds per one gallon.

In this disclosure, abbreviation "DDBSA" means dodecyl benzene sulfonic acid.

In this disclosure, abbreviation "CAPB" means cocamidopropyl betaine.

In one aspect, this disclosure relates to compositions for a setting-type joint compound, including ready-mixed setting type joint compounds. Preferred embodiments include a perlite-free, lightweight setting-type joint compound composition comprising calcined gypsum and a foaming agent. Unexpectedly, it was found that despite not comprising perlite, the perlite-free, lightweight setting-type joint compounds according to this disclosure have sanding ease, dry density (package weight), wet density and substrate-surface coverage during application to a substrate substantially equivalent to conventional perlite-containing, lightweight setting-type joint compounds. During manufacturing and/or sanding, expanded perlite may produce airborne dust with potentially respirable crystalline silica (RCS). Because the joint compounds according to this disclosure do not comprise perlite, yet another technical advantage of the present perlite-free, lightweight setting-type joint compounds avoiding the RCS safety concern for operators at the manufacturing plant and users in the field who sand a surface to which a joint compound has been applied.

The joint compounds compositions according to this disclosure comprise (1) a low dry density calcined gypsum; and (2) a foaming agent. These joint compounds can be prepared in dry-powder form which is mixed with water by a user or as a ready-mixed paste which is premixed with water and stored as a ready-to-use paste. The joint compounds according to this disclosure are suitable for many different applications, including for use with interior gypsum panels and exterior gypsum ceiling boards. The joint compounds are lightweight, meaning that the joint compounds have a weight of less than 12 lb/gal when mixed with water. Despite not comprising perlite, the joint compounds are easy to sand, as shown by a comparative analysis in this disclosure. Furthermore, the joint compounds according to this disclosure have acceptable bond to paper tape and low shrinkage, as shown by a comparative analysis in this disclosure.

These technically advantageous features are achieved by formulating the inventive perlite-free, lightweight setting-type joint compound with a combination of several components, as described below.

A first necessary component in the perlite-free, lightweight setting-type joint compounds according to this disclosure is calcined gypsum (stucco, plaster, calcium sulfate hemihydrate, calcium sulfate semi-hydrate, calcium sulfate half-hydrate or plaster of Paris). Gypsum can be sourced from mines in the dihydrate form ($CaSO_4 \cdot 2H_2O$), or in form of synthetic gypsum from flue gas desulfurization (FGD). Mined gypsum (landplaster) is composed mostly of calcium sulfate dihydrate, preferably 80% or more by weight calcium sulfate dihydrate and more preferably, about 90% to 95% by weight calcium sulfate dihydrate, and may also contain impurities and inert materials which are typically found in natural gypsum ore. Gypsum is then calcined in order to drive off some water, which produces calcium sulfate hemihydrate. Depending on various factors, including the source of gypsum and also a method by which gypsum is calcined, calcined gypsum can be produced in alpha-crystal form or beta-crystal form. Alpha crystals are less acicular than beta crystals. As described in U.S. Pat. No. 7,504,165, the entire disclosure of which is incorporated by reference, alpha-calcined gypsum differs in its water demand from beta-calcined gypsum, with alpha-calcined gypsum requiring less water for forming a flowable aqueous gypsum slurry. Suitable calcined gypsum may contain alpha calcium sulfate hemi-hydrate, beta calcium sulfate hemi-hydrate, calcined synthetic gypsum, or any mixtures thereof.

In some embodiments, the perlite-free, lightweight setting-type joint compound according to this disclosure may comprise calcined gypsum in an amount ranging from about 50 wt % to about 95 wt %, preferably from about 60 wt % to about 90 wt %, and most preferably from about 60 wt % to about 75 wt % by weight of dry-powder composition. Preferred calcined gypsum includes that which has a high-water demand and low density. As described previously, alpha calcium sulfate hemi-hydrate conventionally has a low water demand and a higher density. In view of this, it is unexpected that preferred alpha calcium sulfate hemihydrate in formulations according to this disclosure has a high-water demand (consistency) and low density.

Preferred calcined gypsum according to this disclosure may include low-density and high-consistency calcium sulfate hemihydrate, and more preferably, beta calcium sulfate hemihydrate or alpha calcium sulfate hemihydrate which was produced by calcining gypsum under increased saturated steam pressure, e.g. by autoclaving in a saturated steam atmospheric pressure ranging from about 13 to about 60 psi. The resulting particle size distribution in alpha calcium sulfate hemihydrate has a higher surface-area-to-volume ratio, contributing to both a higher normal pour consistency and significantly lower dry loose bulk density. Leveraging these two beneficial properties of calcium sulfate hemihydrate, preferably alpha calcium sulfate hemihydrate, a joint compound composition can be formulated in the absence of perlite that matches the dry density (package weight) requirements, but has wet density and other properties more similar to conventional weight joint compounds.

In embodiments, calcined gypsum is a high-consistency alpha and/or beta calcium sulfate hemihydrate with a dry (without water being added) loose (without compaction) bulk density in the range from about 30 to about 50 pounds per cubic foot ($lb/ft^3$) and more preferably, in the range from about 40 to about 50 $lb/ft^3$. In this disclosure, "low dry loose bulk density" means a density of less or equal to 50 lb/ft' wherein "dry" means no water added, "loose" means without compaction and "bulk" means powder in general and not per individual particle. In this disclosure, "low dry loose bulk density" may be simply referred to as "low density."

In this disclosure, "high-consistency" means a water demand of at least 50 cc or more, e.g., 52, 53, 54, 55, 56, 57, 58, 59, or 60 cc of water per 100 grams of calcined gypsum.

Examples of "high-consistency" ranges include, but are not limited to, from about 50 cc to about 70 cc, and more preferably from about 50 cc to about 65 cc, e.g., from about 50 to about 52, 53, 54, 55, 56, 57, 58, 59 or 60 cc of water per 100 grams of calcined gypsum. In this disclosure, "water demand" means the amount of water needed for producing a gypsum slurry which flows and is pourable. The water demand may be expressed as a volume of water in cc (or ml) per 100 grams of calcined gypsum. In the alternative, the water demand may be expressed as water-to-stucco ratio (WSR), which is a dimensionless fractional representation for the water consistence value. A water demand for a gypsum slurry can be measured in a slump test which can be conducted essentially as described in U.S. Pat. No. 7,504, 165, herein incorporated by reference.

In some preferred embodiments, the setting-type joint compounds according to this disclosure may be formulated with calcined gypsum which is a high-consistency alpha or beta calcium sulfate hemihydrate, or any mixture thereof, with a dry loose bulk density of about 45 pounds per cubic foot (lb/ft$^3$) and a normal pour consistency water demand of about 60 cubic centimeters (cc) of water per 100 grams of calcined gypsum.

In some embodiments, calcined gypsum in addition to or instead of alpha calcium sulfate hemihydrate may comprise beta stucco with a low density and a high-water consistency such as for example, as continuous kettle stucco (CKS) produced by continuous calcining of gypsum in a kettle. Preferably, the kettle contains a fluidized bed. Preferably, continuous calcining in a kettle is conducted at a temperature in the range from about 250° F. to about 600° F. More preferably, continuous calcining in a kettle can be conducted at a temperature in the range from 275° F. to 356° F. (135-180° C.). Methods for producing CKS stucco are known in the art, including as described in U.S. Pat. Nos. 3,307,915, 3,236,509, 4,113,836, 4,183,908, 4,201,595, 4,117,070 and 4,153,373, all incorporated herein by reference in their entirety.

Another component which is necessary in combination with a low-density calcined gypsum is a foaming agent. It has been unexpectedly found that certain foaming agents may be used instead of perlite, in order to improve sanding ease, decrease the wet density of the composition and improve distribution and adhesion of the composition to a substrate.

The foaming agent in certain embodiments is a foaming surfactant. The foaming surfactant may be preferably an anionic surfactant, a nonionic surfactant, a cationic surfactant, or any combination thereof. In some embodiments, the compositions of this disclosure may comprise at least one anionic surfactant, preferably having a liner alkyl chain containing between 8 and 14 carbons. Suitable anionic surfactants include, but are not limited to, those having the hydrophilic-lipophilic balance (HLB) of at least 10 or higher, e.g., having the HLB value that falls within the range from 10 to 40, 10 to 30, or 10 to 20.

In this disclosure hydrophilic-lipophilic balance (HLB) value is determined as follows. A Surfactant is a molecule composed of hydrophilic and lipophilic groups. An anionic surfactant is a surfactant that contains one or more anionic hydrophilic groups. The HLB value can be calculated according to the following equation: molecular weight of the hydrophilic end of the molecule multiplied by 20 and then divided by the total molecular weight of the surfactant, as was described in Stavroudis 2009 (WAAC Newsletter, Vol 31, No. 1) and as was originally described in Griffin 1949

"Classification of surface-active agents by HLB." Surfactants having the HLB value greater than 10 exhibit hydrophilic properties.

Preferred foaming agents may include anionic surfactants which are alkylbenzene sulfonates having a linear alkyl chain containing between 8 and 14 carbons, preferably between 10 and 12 carbons, or any salt thereof. For dry-powder formulations, the surfactants may be preferably used in their powder form, e.g., as a sodium salt. In embodiments, the compositions of this disclosure may comprise from about 0.01 wt % to about 0.5 wt %, preferably from about 0.01 wt % to about 0.1 wt %, of the anionic surfactant by weight of dry-powder composition.

Particularly preferred anionic surfactants include dodecyl benzene sulfonic acid ("DDBSA," 2-dodecylbenzenesulfonic acid having PubChem CID number 25457) or any water-soluble salt thereof (sodium, potassium, magnesium, ammonium, etc.) and in particular, sodium dodecyl benzene sulfonate which is commercially available in the powder form.

Preferably, a composition for the perlite-free, lightweight setting-type joint compound according to this disclosure may further comprise one or more co-surfactants which may be used in order to increase foaming and improve foam stability. Suitable co-surfactants may include betaines, alkanolamides, alkylpolyglucosides, and/or alkyl ethoxylates. Particularly preferred betaine co-surfactants include those disclosed in U.S. Patent Publication 2016/0031761. If present, a co-surfactant may be used in any amount ranging from about 0.1 wt % to about 1.0 wt %, and preferably, from about 0.1 wt % to about 0.5 wt % of the co-surfactant by weight of dry-powder composition. One particularly preferred betaine includes cocoamidopropyl betaine (CAPB) available from Stepan Company under the trademark AMPHOSOL CG-50.

Figure 1B:
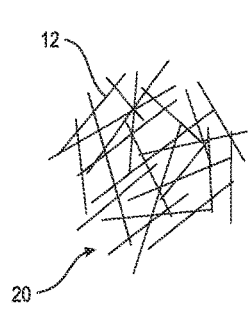
FIG. 1B is a schematic depicting a prior art joint compound with no perlite, having a high wet density. This figure is not drawn to scale.
Figure 1C:
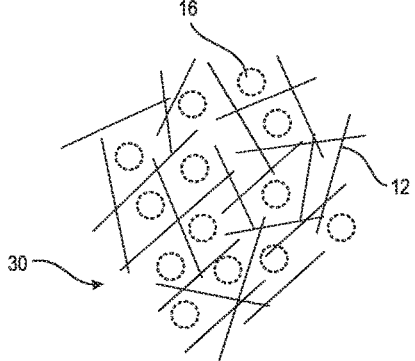
FIG. 1C is a schematic depicting one embodiment of the inventive joint compound comprising one or more surfactants preferably with foaming aids (not shown) and having foam bubbles which replace hollow perlite microspheres of prior art and provide the same lightweight properties, including low wet density, as perlite. This figure is not drawn to scale.

Referring to FIGS. 1A, 1B and 1C, prior art joint compounds (10 or 20) include those that comprise perlite microspheres (14) incorporated in hydrating gypsum matrix (12). Joint compounds (10) which comprise perlite microspheres (14) have low wet density when mixed with water, while prior art joint compounds (20) without perlite have a high wet density. As shown in FIG. 1C, an inventive joint compound according to this disclosure, generally (30), when mixed with water produces microfoam bubbles, wherein the air-joint compound interface is stabilized by the presence of the surfactants and co-surfactants (16) which intermix with hydrating gypsum matrix (12). It was unexpectedly found that the microfoam bubbles (16) are stable during joint compound working time and produce a low wet density joint compound even as no perlite is used in these compounds.

In this disclosure "microfoam bubble" means a bubble of air entrained in the joint compound matrix with at least one dimension approximately on the micron scale. The interface between the joint compound phase and the air bubble is stabilized by the presence of the foaming agents, i.e., a saturated layer of surfactants, co-surfactants, and/or adjuvants.

A composition for the perlite-free, lightweight setting-type joint compound according to this disclosure may further comprise one or more rheology modifiers which may be used in small amounts, e.g., from about 0.1 wt % to about 10 wt %, and more preferably from about 0.1 wt % to about 1 wt %, by weight of dry-powder composition.

A composition for the perlite-free, lightweight setting-type joint compound may further comprise one or more foaming adjuvants. Suitable foaming adjuvants may include myristic acid, stearic acid, salts of alkyl fatty acid carboxylates (e.g., sodium, potassium), or any combination thereof. The foaming adjuvants may be used in small amounts, e.g., from 0.01 to 1 wt %, by weight of dry-powder composition.

A composition for the perlite-free, lightweight setting-type joint compound may further comprise or more foam stabilizers which act to extend the life of the microfoam bubbles in the presence of surfactants and/or co-surfactants. These foam stabilizers also function as rheology modifiers. Suitable microfoam bubble stabilizers include gums, e.g., xanthan gum, gellan gum, and guar gum, and modified celluloses, e.g., hydroxyethyl cellulose (HEC). Foam stabilizers may be used in amounts from 0.01 wt % to 2 wt %, and preferably 0.05 wt % to 0.5 wt %, by weight of dry-powder composition.

One necessary rheology modifier is a clay having gelling and rheological properties for thickening and stabilizing a gypsum composition when mixed with water. A particularly preferred clay may be attapulgite which contains hydrous magnesium aluminum silicate, although other clays, such as for example, as bentonite, sepiolite, and/or kaolinite may be also used either instead or in addition to attapulgite. The clay may be used in any amount sufficient to improve the gelling and rheological properties of the compositions according to this disclosure. In embodiments, the clay, preferably the attapulgite clay, may be used in an amount from about 2 wt % to about 10 wt % by weight of dry-powder composition.

The compositions according to this disclosure may further comprise one or more starches, preferably, pregelatinized and/or modified starches, preferably a pregelatinized wheat, corn and/or potato starch, as a second rheological modifier which may be used in combination with the gelling clay. The one or more starches may be used in any amount sufficient to improve gelling properties of the joint compounds according to this disclosure. In some embodiments, the one or more starches may be used in an amount from about 0.1 wt % to about 2 wt % by weight of dry-powder composition. Preferably, the one or more starches may be pregelatinized. Preferably, the one or more starches may be modified in order to improve their properties as a thickener, water-retention aid, and their solubility in cold water without heating. Preferred modifications may include pre-gelatinization and/or treating the starch with an inorganic acid and/or carboxymethylating it in order to decrease its viscosity and/or improve its adhesive properties.

One or more rheology modifiers may further include modified cellulose, in particular hydroxypropyl methylcellulose (HPMC), hydroxyethyl cellulose (HEC), methyl cellulose, hydroxyethyl cellulose, hydroxyethyl methylcellulose (HEMC), hydroxyethyl cellulose, and/or carboxymethylcellulose. Particularly preferred rheology modifiers may include carboxymethyl cellulose, hydroxypropyl methyl cellulose, methyl hydroxyethyl cellulose, or any combination thereof. In some embodiments, the one or more modified cellulose compounds may be used in combination with the clay and starch rheological modifiers. In some embodiments, the compositions may comprise one or more modified cellulose compounds in an amount from about 0.1 wt % to about 2 wt % by weight of dry-powder composition.

These cellulosic rheology modifiers may be used as a dry powder or as a solution. If used as a solution, the cellulosic rheology modifier may have a Brookfield viscosity in the range from about 30,000 cps to about 65,000 cps at room temperature. One particularly preferred rheological modifier includes F-type hydroxypropyl methyl cellulose with a 60,000 cps Brookfield viscosity (2% solution) which can be preferably used at about 0.3 wt % by weight of the dry-powder composition.

Other suitable rheological modifiers may include gums and in particular, xanthan gum, which is a polysaccharide, that can be used in addition to or instead of modified cellulose. If present, xanthan gum may be used in the same amount as modified cellulose, e.g., in an amount from about 0.01 wt % to about 2 wt % by weight of dry-powder composition.

Unlike other lightweight setting-type joint compounds, the joint compound according to this disclosure does not comprise perelite which is a naturally occurring inorganic mineral known to be a hydrated natural glass composed of silicon, aluminum, and oxygen and containing occluded water. Methods for preparing expanded perlite are known, for example from U.S. Pat. No. 6,712,898, incorporated herein by reference.

The joint compound composition of this disclosure may optionally include fillers. If present, any of the following fillers may be used either alone or in combination with other fillers: mica, talc, clays, in particular kaolinite, sericite, calcium carbonate which can be sourced as calcite, limestone and/or dolomitic limestone, calcium oxide which can sourced as lime which can be produced by roasting limestone, glass microspheres, pyrophyllite, diatomaceous earth, vermiculite, fly ash, or any combination thereof.

In certain embodiments, the joint compound compositions may comprise calcium carbonate, preferably calcium carbonate which can be sourced as calcite, limestone and/or dolomitic limestone, may be used in an amount from about 2 wt % to about 30 wt %, and more preferably from about 3 wt % to about 25 wt % by weight of dry-powder composition. The other fillers, e.g., mica and/or talc may be used in addition to or instead of calcium carbonate. These fillers can be also used in an amount from about 2 wt % to about 30 wt %, and more preferably from about 3 wt % to about 25 wt %.

In certain embodiments, the compositions may comprise calcium carbonate in an amount from about 2 wt % to about 30 wt %, and more preferably from about 3 wt % to about 25 wt % by weight of dry-powder composition and mica and/or talc in an amount from about 1 wt % to about 10 wt % by weight of dry-powder composition. Calcium oxide (lime) may be further added in small amounts, e.g., from about 0.1 wt % to about 1 wt % by weight of dry-powder composition.

Preferably, joint compounds according to this disclosure may comprise one or more binders. Suitable binders include, but are not limited to polyvinyl alcohol, starch, polyvinyl acetate, styrenebutadiene, ethylenevinyl acetate co-polymer, vinyl-acrylic co-polymer, other acrylic polymers, and/or any combination thereof. Suitable starch binders may comprise one or more of the following: wheat starch, corn starch, potato starch or any mixture thereof. The starch may be pregelatinized or otherwise modified, e.g., alkylated or treated with an acid. Any of these binders either alone or in combination with other binders may be used in an amount from about 0.1 wt % to about 10 wt % by weight of dry-powder composition.

The joint compound compositions according to this disclosure may further comprise other additives. Non-limiting examples of additives include phosphate compounds, set accelerators, set retarders, bactericides, fungicides, pH adjusters, setting-reaction indicators, coloring agents and/or humectants, among others.

Compositions for joint compounds according to this disclosure may include dry-powder compositions as well as ready-mixed joint compounds which are premixed with water during manufacturing and provided to users as a premixed paste. Such ready-mixed compositions are formulated as a paste which comprises water, preferably in an amount from about 40 wt % to 60 wt % by weight of dry-powder composition.

Joint compounds according to this disclosure, particular ready-mixed joint compounds, may include one or more phosphate compounds useful for preventing a premature setting reaction in a ready-mixed joint compound during storage, as described in U.S. Pat. Nos. 5,746,822 and 10,669,215, the entire disclosures of both patents are herein incorporated by reference in their entirety.

Suitable phosphate compounds include cyclic polyphosphates, condensed phosphoric acids, and monobasic salts or monovalent ions of orthophosphates. Particularly preferred phosphate compounds include, but are not limited to, trimetaphosphate salts and tetrametaphosphate salts. Particularly preferred phosphate compounds include sodium trimetaphosphate ("STMP"), potassium trimetaphosphate, ammonium trimetaphosphate, sodium hexametaphosphate, tetrapotassium tripolyphosphate, ammonium polyphosphate, aluminum trimetaphosphate or any combination thereof. As reported in U.S. Pat. No. 9,174,881, zinc hexametaphosphate, potassium tripolyphosphate, tetra sodium pyrophosphate, sodium tripolyphosphate, monoammonium phosphate and monobasic potassium phosphate may be particularly suitable for ready-mixed joint compounds.

The joint compounds according to this disclosure may comprise from about 0.05 wt % to about 10 wt % of one or more phosphate compounds by weight of calcined gypsum, preferably from about 0.1 wt % to about 5 wt % of one or more phosphate compound by weight of dry-powder composition.

Joint compounds according to this disclosure may further comprise one or more of set retarding agents which may be used in order to delay a hydration reaction of calcined gypsum and for increasing a workable time of the joint compound during which it can be applied to a substrate. Such set retarding agents may include, but are not limited to, commercially available proteinaceous retarders, diethylenetriamine pentaacetic acid (DTPA), tartaric acid, citric acid, maleic acid or salts thereof, including in particular sodium citrate and/or potassium bitartrate (cream of tartar), or any combination thereof. A set retarding agent can be used in a small amount, for example in an amount in the range from about 0.01% to about 1.5% by weight of calcined gypsum, preferably in an amount in the range from about 0.05% to about 0.5% by weight of calcined gypsum.

The joint compound compositions according to this disclosure may include one or more set accelerators which can be supplied in a separate container, as described for example in U.S. Pat. No. 9,174,881, and then mixed with the joint compound composition just prior to its use. Suitable set accelerators include those disclosed in U.S. Pat. Nos. 5,746,822, 9,174,881 and 10,669,215. Particularly preferred set accelerators may include zinc sulfate, alum, aluminum sulfate, a double sulfate of potassium and aluminum, a double sulfate of aluminum and ammonia, a combination of zinc sulfate and iron sulfate, a combination of zinc sulfate and aluminum sulfate, a combination of zinc sulfate and iron oxide, calcium sulfate, calcium sulfate dihydrate, or any combination thereof.

Preferred set accelerators also include climate stabilized accelerator (CSA) which may contain about 95% of calcium sulfate dihydrate co-ground with 5% sugar and then heat processed, as was described in U.S. Pat. No. 3,573,947. Other suitable accelerators include "HRA" which comprises calcium sulfate dihydrate freshly ground with sugar at a ratio of about 5 to about 25 pounds of sugar per 100 pounds of calcium sulfate dihydrate, as described in U.S. Pat. No. 2,078,199. Other accelerators for controlling a setting reaction may include wet gypsum accelerator (WGA) as described in U.S. Pat. No. 6,409,825. Any of these set accelerators either alone or in any combination may be used in any amount suitable for controlling the rate of calcined gypsum hydration.

A total amount of the set accelerator to be used depends on the set accelerator. In some embodiments, from about 0.01 wt % to about 2 wt % of a set accelerator by weight of dry-powder composition may be included.

In embodiments, the joint compound compositions according to this disclosure preferably have a basic pH of at least 7.5, more preferably at least 8.0 or higher. In order to adjust and maintain a pH of the present joint compound in the basic range, various basic compounds can be used, including, but not limited to, sodium hydroxide, ammonia, potassium hydroxide, tri-ethylamine (TEA) or 2-amino-2-methyl-1 propanol (AMP), which can be used in small amounts, e.g., from about 0.1 wt % to about 1 wt % by weight of dry-powder composition.

The joint compound compositions according to this disclosure may comprise one or more humectants. Particularly preferred humectants may include, but are not limited to, glycerol, ethylene glycol, diethylene glycol, triethylene glycol, propylene glycol, di-propylene glycol, and/or tri-propylene glycol, or any combination thereof. If present, the humectant can be used in a small amount, e.g., from about 0.01 wt % to about 5 wt %, and more preferably from about 0.1 wt % to about 5 wt %, by weight of dry-powder composition.

The joint compound compositions according to this disclosure may be formulated as dry-powder compositions or they can be premixed with water as a ready-mixed joint compound. If a powdered joint compound is used, then a user may add water prior to application of the joint compound to a substrate. Water may be added in amounts producing a paste. The amount of water to be used depends on customer preferences. In some embodiments, about 40 cc to about 70 cc of water may be added per 100 grams of powdered composition.

Preferred joint compound compositions according to this disclosure, when mixed with water, include those which have a viscosity in the range from about 150 to about 1,000 Brabender Units (11850-79000 cps) and more preferably from about 300 to about 500 Brabender Units (23700-39500 cps). A Brookfield viscosity is measured at room temperature using a VC-3 Brabender viscometer with a 250 centimeter-gram torsion head operated at a 72-78 r.p.m. spindle speed.

In some embodiments, the joint compound composition according to this disclosure may comprise dry components and liquid components or they can be formulated with dry components only. If liquid components are to be used in the dry-powder formulations, liquid components may be supplied in a separate container. In ready-mixed formulations, all components, but the set accelerator, may be premixed into a paste.

Referring to FIG. 2, it reports a comparative analysis for perlite-free, lightweight setting-type joint compounds according to this disclosure in comparison to control EASY SAND' compound which comprises perlite. As has been shown by the comparative analysis, the present perlite-free, lightweight setting-type joint compounds are characterized by low shrinkage, improved sandability (easy sanding), and excellent adhesion to paper tape. Formulations referred to in FIG. 2 are listed in Examples 1 and 2.

In connection with results reported in FIG. 2, the following tests were conducted.

Dry Density for each sample was measured by filling a cylinder of known volume with a sample of known weight and calculating the density by dividing the weight by volume.

Wet Density for each sample was measured by filling a half-pint cup and calculating the density based on the known density of water. The equation is Density=(weight of compound in cup/weight of water in cup)*8.345. Units are in lbs/gal.

Sanding Ease (Sandability) was measured as follows. Each sample was applied over a 50-mil thickness template and each sample was placed in a stable environmental chamber or room. Once a sample was dried, its weight was measured. Each sample was placed on Gardner Abrasion tester with 150-grit sandpaper for 5 oscillating strokes. Each sample was weighed post sanding and a percentage of removed material was recorded.

Tape Bond 75/50 was conducted essentially as described in U.S. Pat. No. 4,657,594, the entire disclosure of which is herein incorporated by reference in its entirety. Briefly, paper tape was embedded in joint compound mixed with water on gypsum wallboard as follows. First, a layer of joint compound was applied to the gypsum wallboard. Then, the paper tape was laid over the joint compound and embedded with a board knife. Then, additional joint compound was applied on top and made smooth.

Bond to paper tape was then measured by estimating the amount of delaminated paper left on the joint compound after making a 5 inch "X" cut in sections of bonded tape, and then peeling the tape from the joint compound. Bond values of "0 to 7" were assigned depending on how much delaminated paper tape remained bonded to the joint compound. A 5-inch joint compound section completely covered with delaminated tape was assigned a "7" bond value, and a section showing no paper tape was given a "0" bond rating Bonds labeled 75/50 were dried at 75° F. and 50% relative humidity for both one day Cold bonds were dried at 40° F. and 80% relative humidity for one day Redried bonds were cold bonds redried in 75/50 conditions for one day.

Crack Resistance was measured as follows. A sample was applied at a tapered angle (125-mil thickness to 0-mils thickness). Samples were dried in a hot/dry condition under a fan in order to promote extreme cracking conditions at 95° F. and 10% RH. Samples were then evaluated by measuring the total length of cracking that occurs in the sample.

Shrinkage was measured as follows. A sample was applied over a 200-mil thickness template and each sample was placed in a stable environmental chamber or room. Samples were allowed to fully dry over 24-hours. Once a sample was fully set, the thickness of the dried sample was measured.

Vicat Set was measured as follows. The setting time of the samples was measured substantially following a modified ASTM C-472 (Standard Test Methods for Physical Testing of Gypsum, Gypsum Plasters and Gypsum Concrete, ASTM International, West Conshohocken, PA). In summary, approximately 300 g of material was weighed into a half-pint container at previously determined use consistency. Upon stiffening, a 300-g Vicat needle was held above the surface and allowed to penetrate freely into the sample. The setting time is defined as the time at which only 50% of the needle penetrates the joint compound surface.

Based on the comparative analysis, the perlite-free, lightweight setting-type joint compounds according to this disclosure meet or even exceed the requirements for sandability, crack-resistance and adhesion to a substrate, while these compounds do not contain perlite, therefore minimizing production of respirable silica particles during manufacturing and while sanding.

As can be further seen from the comparative analysis, a combination of surfactants as disclosed in the present application is critical to both the hand application performance and the resulting presentation after the finishing step.

In terms of hand application, the joint compound of this disclosure is optimized to have a smooth and creamy texture with balanced body (thixotropy) and slip/flow. The foam structure could alter these properties. Moreover, the creation of surface defects, be it either craters, pinholes, cracking, or an overly rough surface arising from surfactant incorporation in the formula would be detrimental. Surface defects could present either immediately after application (cratering, pinholing) or after setting (cratering, pinholing, cracking), and it could be made worse if they could not be remedied by sanding or other post-finishing steps. As can be seen in the comparative analysis, the joint compounds compositions according to this disclosure produce a smooth surface which is substantially free of surface defects. This result is highly unexpected because foaming agents are known to produce air bubbles and a person of skill would not expect to produce a monolithic surface when using a foaming agent.

In yet another aspect, this disclosure provides methods for making the joint compounds according to this disclosure. In these methods, the joint compound can be formulated as a dry powder or as a ready-mixed setting-type joint compound premixed with water. Some dry-powder compositions may be formulated with all dry components. In these embodiments, a user simply adds water and optionally some additional additives, e.g., one or more set accelerators, just prior to applying the joint compound to a substrate.

In some embodiments, the dry powder joint compounds according to this disclosure may comprise one or more liquid additives. In these embodiments, all dry components may be first mixed into a first mixture. Liquid components may be mixed with some amount of water into a second mixture. The second mixture may be provided in a separate container, and it can be mixed with the first mixture and additional water, if necessary, by a user prior to application to a substrate.

In some embodiments, the setting-type joint compound according to this disclosure may be formulated as a ready-mixed setting type joint compound. In these embodiments, all dry components, except for the set accelerator, are mixed into a first mixture and all liquid components except for the set accelerator, and some amounts of water are mixed together into a second mixture. The first mixture is then mixed with the second mixture, producing a ready-mixed setting type joint compound. In these embodiments, a set accelerator may be supplied in a separate container. The set accelerator can be added to the ready-mixed setting type joint compound by a user just prior to applying the joint compound to a substrate.

In yet another aspect, this disclosure relates to various methods in building construction and surface repair projects. The perlite-free, lightweight setting-type joint compounds according to this disclosure may be used in various applications, including as an all-purpose joint compound and/or as a finishing compound. Further applications may include various repair projects, including for patching cracks, holes and/or indentations.

The present perlite-free, lightweight setting-type joint compounds can be applied over a variety of different substrates, including, but not limited, to wallboard, plaster, cementitious substrate, wood and/or joint tape as may be needed when finishing seams (joints) between two abutting wallboards.

The perlite-free, light weight setting-type joint compounds according to this disclosure are particularly suitable for building a wall assembly. Non-limiting examples of wall assemblies include those described in U.S. Pat. No. 9,249,578, the entire disclosure of which is herein incorporated by reference.

Embodiments of a wall assembly according to this disclosure may comprise three gypsum panels attached (affixed) to framing members (studs) of the frame with fasteners. Some or all of the framing members may be coated with an adhesive in order to improve attachment of the gypsum panels to the frame. Preferably, the framing members are wood studs or a metal framing. When attached to the stud, the adjoining gypsum panels meet with their abutting edges at a seam, which can be referred in this disclosure as a joint.

In order to produce a monolithic surface, strengthen and conceal the seam, the joint may be filled with the perlite-free, lightweight setting type joint compound of this disclosure and preferably, a liquid-permeable paper tape or fiberglass tape is then embedded into the joint compound.

After the joint compound sets, a second coating of the joint compound according to this disclosure may be applied over the joint as a top-coat. A third or finish coating of the joint compound may then be applied and allowed to set. In some embodiments, the joint compound according to this disclosure can be used as an all-purpose joint compound in each of the three applications: for filling joints, as a top-coat and as a finish-coat. In other applications, the joint compound according to this disclosure may be used in combination with conventional joint compounds. For example, a conventional joint compound may be used for filling a joint, while the joint compound according to this disclosure may then used as a top-coat and/or as finish-coat.

The application methods may further comprise sanding the joint compound after the joint compound set and optionally, applying a primer and/or paint.

Various methods can be used for applying the joint compound of this disclosure to the substrate, including with a joint knife and/or by spraying.

The following examples further illustrate perlite-free, lightweight setting-type joint compounds according to this disclosure and their technical advantages in comparison to conventional lightweight setting-type joint compounds which comprise perlite.

Example 1

Various perlite-free, lightweight setting type joint compounds were prepared according to formulations listed below. In preparing the joint compounds, liquid additives were first mixed together with water in a mixing bowl. The dry powder additives were then added. The ingredients were either mixed by hand in a stainless steel mixing bowl for one minute, or, alternatively, they were mechanically mixed for one minute using a Hamilton Beach® Variable-Speed Hand Mixer in the same stainless steel bowl.

The formulations of the compositions are as listed in Table 1 below. Perlite-free formulations and composition by dry weight percentage. Surfactants (DDBSA), cosurfactants (CAPB), foaming thickeners (MHEC and carboxymethyl cellulose), and xanthan gum were evaluated.

TABLE 1

| Amount (grams) | 1711A CONTROL | 1711E TRIAL 1 | 1711F TRIAL 2 | 1711G TRIAL 3 | 1711H TRIAL 4 |
|---|---|---|---|---|---|
| Regular α-Calcium Sulfate Hemihydrate (~60 PCF) | 1350 | 0 | 0 | 0 | 0 |
| Low density α-Calcium Sulfate Hemihydrate (42 PCF) | | 2030 | 2030 | 2030 | 2030 |
| Calcium Carbonate | 1200 | 690 | 700 | 660 | 690 |
| Expanded Perlite | 180 | 0 | 0 | 0 | 0 |
| Attapulgite Clay | 120 | 120 | 120 | 120 | 120 |
| Starch (Waxy Maize) | 9.6 | 9.6 | 9.6 | 9.6 | 9.6 |
| Wheat Starch | 23 | 23 | 23 | 23 | 23 |
| Polyvinyl Alcohol | 9 | 9 | 9 | 9 | 9 |
| Hydroxypropylmethyl cellulose | 8.3 | 0 | 8.3 | 8.3 | 0 |
| Methyl hydroxypropyl cellulose | 0 | 10 | 0 | 0 | 10 |
| Carboxymethyl Cellulose | 0 | 0 | 0 | 30 | 0 |
| Xanthan Gum | 0 | 10 | 0 | 0 | 10 |
| Dodecylbenzene Sulfonic Acid | 0 | 1 | 1 | 1 | 1 |
| Gypsum Accelerator | 1 | 1 | 1 | 1 | 1 |
| Proteinaceous Retarder | 2 | 3 | 3 | 3 | 0 |
| Citric Acid | 0 | 0 | 0 | 0 | 1 |
| Cocamidopropyl Betaine (liquid) | 0 | 8.7 | 8.7 | 0 | 0 |
| | 2902.9 | 2915.3 | 2913.6 | 2894.9 | 2904.6 |
| wt % | | | | | |
| % Total Hemihydrate | 46.51% | 69.63% | 69.67% | 70.12% | 69.89% |
| Regular α-Calcium Sulfate Hemihydrate (~60 PCF) | 46.51% | 0.00% | 0.00% | 0.00% | 0.00% |
| Low density α-Calcium Sulfate Hemihydrate (42 PCF) | 0.00% | 69.63% | 69.67% | 70.12% | 69.89% |
| Calcium Carbonate | 41.34% | 23.67% | 24.03% | 22.80% | 23.76% |
| Expanded Perlite | 6.20% | 0.00% | 0.00% | 0.00% | 0.00% |
| Attapulgite Clay | 4.13% | 4.12% | 4.12% | 4.15% | 4.13% |
| Starch (Waxy Maize) | 0.33% | 0.33% | 0.33% | 0.33% | 0.33% |
| Modified Wheat Starch | 0.79% | 0.79% | 0.79% | 0.79% | 0.79% |
| Polyvinyl Alcohol | 0.31% | 0.31% | 0.31% | 0.31% | 0.31% |
| Hydroxypropylmethyl cellulose | 0.29% | 0.00% | 0.28% | 0.29% | 0.00% |
| Methyl hydroxypropyl cellulose | 0.00% | 0.34% | 0.00% | 0.00% | 0.34% |

TABLE 1-continued

| Amount (grams) | 1711A CONTROL | 1711E TRIAL 1 | 1711F TRIAL 2 | 1711G TRIAL 3 | 1711H TRIAL 4 |
|---|---|---|---|---|---|
| Carboxymethyl Cellulose | 0.00% | 0.00% | 0.00% | 1.04% | 0.00% |
| Xanthan Gum | 0.00% | 0.34% | 0.00% | 0.00% | 0.34% |
| Dodecylbenzene Sulfonic Acid | 0.00% | 0.03% | 0.03% | 0.03% | 0.03% |
| Gypsum Accelerator | 0.03% | 0.03% | 0.03% | 0.03% | 0.03% |
| Proteinaceous Retarder | 0.07% | 0.10% | 0.10% | 0.10% | 0.00% |
| Citric Acid | 0.00% | 0.00% | 0.00% | 0.00% | 0.03% |
| Cocamidopropyl Betaine (liquid) | 0.00% | 0.30% | 0.30% | 0.00% | 0.00% |
| | 100.00% | 100.00% | 100.00% | 100.00% | 100.00% |

Compositions listed in Table 1, wherein 1711A is a control formulation, were tested for sanding ease, shrinkage, and bonding to paper tape. Results of these experiments are reported in Table 2 below which reports performance properties of the perlite-free formulations in the 1711 Series. Note: conditional formatting was used.

TABLE 2

| | 1711A CONTROL | 1711E TRIAL 1 | 1711F TRIAL 2 | 1711G TRIAL 3 | 1711H TRIAL 4 |
|---|---|---|---|---|---|
| Mix Parameters | | | | | |
| Sample size, g | 250 | 250 | 250 | 250 | 250 |
| Finish Water, mL | 145 | 142.5 | 125 | 145 | 132.5 |
| Test Consistency, cc/100 g | 58.0 | 57.0 | 50.0 | 58.0 | 53.0 |
| Brookfield Viscosity, BU | 369 | 348.5 | 358 | 434.0 | 496.3 |
| CIC Vicat Set Time, min. | 55 | | 210 | | 168 |
| Dry Loose Bulk Density (PCF) | 41.8 | 48.0 | 47.1 | 46.6 | 46.6 |
| Wet Density, lbs/gal (½pint/34.71) by hand | 10.9 | 12.2 | 12.5 | 11.8 | |
| Wet Density, lbs/gal (½pint/34.71) by hand mixer | 10.3 | 10.5 | 11.1 | 10.5 | 10.5 |
| Wet Density, lbs/gal (½pint/34.71) mechanical mix then remix at 2 hrs by hand | | | 11.5 | | |
| Bond to Paper Tape (0 to 7; 7 = best) 75° F. (24° C.)/50% RH | 24 hrs after application (1st: 7, 6.5, 5.5), (2nd: 7, 7, 6.5) | 24 hrs after application | 24 hrs after application 6.5, 6, 5.5 (1st) | 24 hrs after application 2, 3.5, 3 (2nd) | 24 hrs after application |
| ⅛" Fill Crack Panel (95 F./10% RH): Forced Air-Dried @ 95 F./10% RH | 0 (smooth) | | 0 (rough foamy) | considerable cracking | Extensive with considerable lumps |
| Shrinkage, volume % | 17.73% | | 16.75% | 35.47% | |
| Sanding Ease | | | | | |
| % Mass Loss | 5.0% | | 5.7% | | |
| Hand Mix Notes: *(color, graininess, time to wet out) | No bubbles less lumps compared to F | | Some small lumps, bubbles | Considerably lumpy | |
| Application Notes | | | Feels loose, grainy | Really wet, super slick, awesome slip, good edges | |

Example 2

Various perlite-free, lightweight setting type joint compounds were prepared according to formulations listed below in laboratory quantities. In preparing the joint compounds, liquid additives were first mixed together with water in a mixing bowl. The dry powder additives were then added. The ingredients were either mixed by hand in a stainless steel mixing bowl for one minute, or, alternatively, they were mechanically mixed for one minute using a Hamilton Beach® Variable-Speed Hand Mixer in the same stainless steel bowl.

The formulations of the compositions were as listed in Table 3 below. Perlite-free formulations and composition by dry weight percentage for the 1714 Series. Surfactants (DDB SA), cosurfactants (CAPB), foaming thickeners (Tylose 60,000 YP4) were evaluated.

TABLE 3

| Amount (grams) | 1714A CONTROL | 1714B TRIAL 1 | 1714C TRIAL 2 | 1714D TRIAL 3 |
|---|---|---|---|---|
| Regular α-Calcium Sulfate Hemihydrate (~60 PCF) | 1350 | 0 | 0 | 0 |
| Low Density α-Calcium Sulfate Hemihydrate (42 PCF) | 0 | 2030 | 2600 | 2030 |
| Calcium Carbonate | 1200 | 630 | 120 | 480 |
| Expanded Perlite | 180 | 0 | 0 | 0 |
| Attapulgite Clay | 120 | 180 | 120 | 180 |
| Mica | 0 | 0 | 0 | 150 |
| Starch (Waxy Maize) | 9.6 | 9.6 | 9.6 | 9.6 |
| Wheat Starch | 23 | 23 | 23 | 23 |
| Polyvinyl Alcohol | 9 | 9 | 9 | 15 |
| Hydroxypropyl Methylcellulose | 8.3 | 12 | 8.3 | 0 |
| Methyl Hydroxypropylcellulose | 0 | 0 | 0 | 10 |
| Methyl Hydroxyethylcellulose | 0 | 0 | 0 | 0 |
| Carboxymethyl Cellulose | 0 | 0 | 0 | 0 |
| Xanthan Gum | 0 | 0 | 0 | 0 |
| Dodecylbenzene Sulfonic Acid | 0 | 1 | 1 | 1 |
| Gypsum Accelerator | 1 | 1 | 1 | 1 |
| Proteinaceous Retarder | 2 | 1 | 1 | 1 |
| Citric Acid | 0 | 0 | 0 | 0 |
| Cocamidopropyl Betaine (liquid) | 0 | 8.3 | 8.3 | 8.3 |
| Hydrated Lime | 0 | 0 | 0 | 1 |
| | 2902.9 | 2904.9 | 2901.2 | 2909.9 |
| wt % | | | | |
| % Total Hemihydrate | 46.51% | 69.88% | 89.62% | 69.76% |
| Regular α-Calcium Sulfate Hemihydrate (~60 PCF) | 46.51% | 0.00% | 0.00% | 0.00% |
| Low Density α-Calcium Sulfate Hemihydrate (42 PCF) | 0.00% | 69.88% | 89.62% | 69.76% |
| Calcium Carbonate | 41.34% | 21.69% | 4.14% | 16.50% |
| Expanded Perlite | 6.20% | 0.00% | 0.00% | 0.00% |
| Attapulgite Clay | 4.13% | 6.20% | 4.14% | 6.19% |
| Mica | 0.00% | 0.00% | 0.00% | 5.15% |
| Starch (Waxy Maize) | 0.33% | 0.33% | 0.33% | 0.33% |
| Wheat Starch | 0.79% | 0.79% | 0.79% | 0.79% |
| Polyvinyl Alcohol | 0.31% | 0.31% | 0.31% | 0.52% |
| Hydroxypropyl Methylcellulose | 0.29% | 0.41% | 0.29% | 0.00% |
| Methyl Hydroxypropylcellulose | 0.00% | 0.00% | 0.00% | 0.34% |
| Methyl Hydroxyethylcellulose | 0.00% | 0.00% | 0.00% | 0.00% |
| Carboxymethyl Cellulose | 0.00% | 0.00% | 0.00% | 0.00% |
| Xanthan Gum | 0.00% | 0.00% | 0.00% | 0.00% |
| Dodecylbenzene Sulfonic Acid | 0.00% | 0.03% | 0.03% | 0.03% |
| Gypsum Accelerator | 0.03% | 0.03% | 0.03% | 0.03% |
| Proteinaceous Retarder | 0.07% | 0.03% | 0.03% | 0.03% |
| Citric Acid | 0.00% | 0.00% | 0.00% | 0.00% |
| Cocamidopropyl Betaine (liquid) | 0.00% | 0.29% | 0.29% | 0.29% |
| Hydrated Lime | 0.00% | 0.00% | 0.00% | 0.03% |
| | 100.00% | 100.00% | 100.00% | 100.00% |

The compositions listed in Table 3, wherein 1714A is a control formulation, were tested for sanding ease, shrinkage, and binding to a paper tape. Results of these experiments are reported in Table 4 below. Performance properties of the perlite-free formulations in the 1714 Series. Note: conditional formatting was used.

TABLE 4

| | 1714A CONTROL | 1714B TRIAL 1 | 1714C TRIAL2 | 1714D TRIAL3 |
|---|---|---|---|---|
| Mix Parameters | | | | |
| Sample size, g | 250 | 250 | 250 | 250 |
| Finish Water, mL | 142.5 | 135 | 132.5 | 140 |
| Test Consistency, cc/100 g | 57.0 | 54.0 | 53.0 | 56.0 |
| Brookfield Viscosity, BU (Mechanical Mix) | 395.2 | 395.2 | 347.0 | 483.9 |
| Vicat Set Time, min. | 57 | 53 | 63 | 66 (by hand) |
| Dry Loose Bulk Density (PCF) | 43.5 | 44.9 | 42.7 | 43.1 |
| Wet Density, lbs/gal (½pint/34.71) by hand | 10.9 | 12.4 | 12.3 | 11.5 |
| Wet Density, lbs/gal (½pint/34.71) Mechanical Mix | 10.2 | 10.9 | 11.0 | 10.4 |
| Wet Density mechanical mix then remix by hand 40 min | 10.3 | | 11.4 | 10.8 |
| Brookfield Viscosity BU: Thickening Curve (min) 2 | | 388.6 | 361.1 | 481.4 |
| 5 | | 414.7 | 392.2 | 476.7 |
| 10 | | 457.9 | 423.9 | 488.3 |
| 15 | | 485.5 | 455.3 | 513.8 |
| 20 | | 501.5 | 487.8 | 542.4 |
| 25 | | 521.8 | 511.3 | 564.6 |
| 30 | | 553.0 | 535.5 | 597.5 |
| 35 | | 586.1 | 577.8 | 620.9 |
| 40 | | 630.7 | 612.1 | 713.2 |
| 45 | | 723.1 | 759.1 | 851.6 |
| 50 | | Max torque | Max torque | Max torque |
| Bond to Paper Tape (0 to 7; 7 = best) | 24 hrs after application | 24 hrs after application | 24 hrs after application | 24 hrs after application |
| 75° F. (24° C.)/50% RH | (1st: 6, 6, 6.5), (2nd: 6.5, 6, 6) | 4, 6, 6 (1st) | 6.5, 6, 4.5 (1st) | 4.5, 5.5, 6 (2nd) |
| ⅛″ Fill Crack Panel (95 F./10% RH): Forced Air-Dried @ 95 F./10% RH | 0 (smooth) | Few microcracks (rough) | Considerable microcracks top left, bottom left (slightly rough) | moderate microcracks, spider cracks |
| Shrinkage, volume % | 19.21% | 15.27% | 12.81% | 10.40% |
| pH | | 8.09 | 7.89 | 8.58 |
| Sanding Ease | | | | |
| % Mass Loss | 4.48 (1st), 4.76 (2nd) | 4.43 (1st) | 3.05 (1st) | 4.03 (2nd) |
| Hand Mix Notes: *(color, graininess, time to wet out) | Airy, light, "whipped cream" | Darker, slightly more lumps | Darker, less lumps than C, more similar to Control | really grainy mix, wets out quickly |
| Application Notes | Light, airy, no resistance, creamy free | See microair, foam, slight lumps, super slick, wet, good slip | Similar foam to B, air but wipes out, grit | more bodied, grainy, heavier |

Results from tests in Tables 2 and 4 are also summarized in a matrix of FIG. 2, comparing key performance properties of the perlite-free, lightweight setting-type joint compounds of this disclosure to a control joint compound which comprises perlite. In connection with tables 2, 4 and FIG. 2, results were divided into the following groups as shown in Table 5.

TABLE 5

| Superior to control | Group 1 |
|---|---|
| Within specification | Group 2 |
| Within (or close to) specification but does not meet control | Group 3 |
| within 5% deviation from the specification | Group 4 |
| within 15% deviation from the specification | Group 5 |

TABLE 5-continued

| >15% deviation from the specification | Group 6 |
|---|---|
| Extreme deviation from the specification | Group 6 |

What is claimed is:

1. A composition for perlite-free, lightweight setting-type joint compound, wherein the composition comprises:

calcium sulfate hemihydrate with a dry density of less than 50 lb/ft$^3$ and water consistency of at least 50 cc of water per 100 grams of calcium sulfate hemihydrate;

a foaming agent having a hydrophilic-lipophilic balance (HLB) value of at least 10, the foaming agent comprising an alkylbenzene sulfonic acid having a linear alkyl chain containing 8 to 14 carbons and/or a salt thereof;

a co-surfactant, wherein the co-surfactant includes a betaine, alkanolamide, alkylpolyglucoside, alkyl ethoxylate, or any combination thereof;

a rheology modifier including one or more of the following: modified cellulose, starch, and/or attapulgite clay; and wherein the composition does not comprise perlite.

2. The composition of claim 1, wherein calcium sulfate hemihydrate includes alpha calcium sulfate hemihydrate in an amount ranging from about 50 wt % to about 95 wt %.

3. The composition of claim 2, wherein alpha calcium sulfate hemihydrate is obtained by autoclaving gypsum in a saturated steam atmospheric pressure, and wherein alpha calcium sulfate hemihydrate has a dry density of about 45 lb/ft$^3$ and water consistency of about 60 cc per 100 grams of alpha calcium sulfate hemihydrate.

4. The composition of claim 1, wherein the composition comprises from about 0.01 wt % to about 0.5 wt % of the foaming agent.

5. The composition of claim 1, wherein the composition comprises dodecyl benzene sulfonic acid or any salt thereof, and/or the composition comprises cocoamidopropyl betaine, or any combination thereof.

6. The composition of claim 1, wherein the composition comprises from about 0.1 wt % to about 1.0 wt % of the co-surfactant.

7. The composition of claim 1, wherein the composition comprises modified cellulose and/or starch in an amount from about 0.1 wt % to about 2 wt %.

8. The composition of claim 1 wherein the composition comprises carboxymethyl cellulose, hydroxypropyl methyl cellulose, xanthan gum, methyl hydroxyethyl cellulose, attapulgite clay, or any combination thereof.

9. The composition of claim 1, wherein the composition comprises one or more of the following: mica, talc, calcium carbonate, and/or any combination thereof.

10. The composition of claim 1, wherein the composition comprises water in an amount ranging from about 40 cc to 70 cc of water per 100 grams of the composition.

11. The composition of claim 1, wherein the composition further comprises a binder which includes one or more of the following: polyvinyl alcohol, polyvinyl acetate, styrenebutadiene, ethylenevinyl acetate co-polymer, vinyl-acrylic co-polymer, and/or any combination thereof.

12. The composition of claim 1, wherein the composition is a ready-mixed composition which further comprises water and one or more of phosphate compounds.

13. The composition of claim 1, wherein the composition comprises one or more of foaming adjuvants and/or foam stabilizers, or any combination thereof.

14. The composition of claim 1, wherein the composition further comprises one or more of the following: diethylenetriamine pentaacetic acid, tartaric acid, citric acid, maleic acid or salts thereof.

15. The composition of claim 1, wherein the composition further includes one or more set accelerators enclosed in a separate container.

16. The composition of claim 1, wherein the composition comprises:

about 60 wt % to about 90 wt % of alpha calcium sulfate hemihydrate having a dry density in the range from about 30 to about 50 lb/ft$^3$ and having a water consistency of at least about 50 cc of water per 100 grams of calcined gypsum;

about 2 wt % to about 30 wt % of calcium carbonate;

about 0.01 wt % to about 0.5 wt % of sodium dodecyl benzene sulfonate;

optionally, about 0.1 wt % to about 1 wt % of cocamidopropyl betaine;

optionally, about 1 wt % to about 10 wt % mica and/or talc;

about 2 wt % to about 10 wt % of attapulgite clay;

about 0.1 wt % to about 2 wt % of one or more pregelatinized starches;

about 0.1 wt % to about 2 wt % of one or more of the following: carboxymethyl cellulose, hydroxypropyl methyl cellulose, methyl hydroxyethyl cellulose, or any combination thereof;

optionally, about 0.1 wt % to about 2 wt % of xanthan gum; and about 0.1 wt % to about 10 wt % of a binder.

17. A method for finishing a seam between two adjacent gypsum panels attached to a stud, the method comprising filling the seam with the composition of claim 1, and/or applying the composition as a top-coat.

18. A wall assembly comprising the composition of claim 1.

19. A method for making a perlite-free, lightweight setting-type joint compound, the method comprising: mixing the composition of claim 1 with water forming the perlite-free, lightweight setting-type joint compound.

\* \* \* \* \*